United States Patent
Wang et al.

(10) Patent No.: US 10,816,685 B2
(45) Date of Patent: *Oct. 27, 2020

(54) SYSTEM AND METHOD FOR RECONSTRUCTED WAVEFIELD IMAGING

(71) Applicant: ION Geophysical Corporation, Houston, TX (US)

(72) Inventors: Chao Wang, Houston, TX (US); Howard David Yingst, Houston, TX (US)

(*) Notice: Subject to any disclaimer, the term of this patent is extended or adjusted under 35 U.S.C. 154(b) by 399 days.

This patent is subject to a terminal disclaimer.

(21) Appl. No.: 15/847,846

(22) Filed: Dec. 19, 2017

(65) Prior Publication Data

US 2018/0172858 A1    Jun. 21, 2018

Related U.S. Application Data (60) Provisional application No. 62/436,724, filed on Dec. 20, 2016.

(51) Int. Cl.
*G01V 1/28* (2006.01)
*G01V 1/00* (2006.01)

(52) U.S. Cl.
CPC .............. *G01V 1/282* (2013.01); *G01V 1/005* (2013.01); *G01V 2210/614* (2013.01);
(Continued)

(58) Field of Classification Search
CPC .. G01V 1/282; G01V 2210/679; G01V 1/005; G01V 2210/661; G01V 2210/66
See application file for complete search history.

(56) References Cited

U.S. PATENT DOCUMENTS 4,953,142 A    8/1990  Rimmer
7,373,252 B2   5/2008  Sherrill et al.
(Continued)

FOREIGN PATENT DOCUMENTS

EP    3073296 A1    9/2016
GB    2509223 A     6/2014
WO    2015159151 A2 10/2015

OTHER PUBLICATIONS

International Search Report and Written Opinion dated Mar. 15, 2017 in connection with International Application No. PCT/US2016/066103, 17 pages.
(Continued)

*Primary Examiner* — Ian J Lobo (57) ABSTRACT

Computer systems and methods are provided for time domain reconstructed seismic wavefield imaging. The original source signal or extended source can be forward propagated based on a model of a subsurface region, in order to generate a residual by comparison to field data. The residual can be back-propagated to generate a reconstructed source signal, which can be forward propagated to generate a reconstructed source wavefield. Seismic images can be generated by cross correlating the forward-propagated reconstructed source wavefield and the back-propagated receiver wavefield. The model can include seismic parameters such as velocity, density, anisotropy and attenuation characterizing the subsurface region, and can be iteratively refined to improve image quality, based on the reconstructed source wavefield in comparison to the field data.

23 Claims, 7 Drawing Sheets

(52) U.S. Cl.
CPC .... *G01V 2210/66* (2013.01); *G01V 2210/661* (2013.01); *G01V 2210/679* (2013.01)

(56) References Cited

U.S. PATENT DOCUMENTS

| | | | |
|---|---|---|---|
| 8,385,151 | B2 | 2/2013 | Liu |
| 8,773,951 | B2 | 7/2014 | Shan et al. |
| 9,081,115 | B2 | 7/2015 | Routh et al. |
| 9,158,018 | B2 | 10/2015 | Fuck et al. |
| 9,201,153 | B2 | 12/2015 | Fletche et al. |
| 9,244,181 | B2 | 1/2016 | Rickett et al. |
| 9,465,125 | B2 | 10/2016 | Zhang et al. |
| 10,578,755 | B2 * | 3/2020 | Wang .................... G01V 1/36 |
| 2007/0203673 | A1 | 8/2007 | Sherrill et al. |
| 2010/0054082 | A1 | 3/2010 | Mcgarry et al. |
| 2010/0118651 | A1 | 5/2010 | Liu et al. |
| 2010/0302906 | A1 | 12/2010 | Liu |
| 2011/0085413 | A1 | 4/2011 | Keers et al. |
| 2011/0090760 | A1 | 4/2011 | Rickett et al. |
| 2011/0317519 | A1 * | 12/2011 | Liu .......................... G01V 1/28 367/50 |
| 2012/0236685 | A1 * | 9/2012 | Shan ....................... G01V 1/28 367/50 |
| 2012/0259601 | A1 | 10/2012 | Fuck et al. |
| 2013/0107665 | A1 | 5/2013 | Fletcher et al. |
| 2013/0343154 | A1 | 12/2013 | Zhang et al. |
| 2014/0129479 | A1 | 5/2014 | Warner et al. |
| 2015/0012256 | A1 | 1/2015 | Routh et al. |
| 2016/0146961 | A1 | 5/2016 | Ratcliffe et al. |
| 2016/0187506 | A1 | 6/2016 | Ratcliffe et al. |
| 2016/0238729 | A1 | 8/2016 | Warner et al. |
| 2016/0320505 | A1 | 11/2016 | D'afonseca et al. |
| 2017/0031041 | A1 | 2/2017 | Ratcliffe et al. |
| 2017/0168177 | A1 | 6/2017 | Wang et al. |
| 2017/0276814 | A1 * | 9/2017 | Zhang .................... G01V 1/282 |
| 2017/0371050 | A1 * | 12/2017 | Sun ........................ G01V 1/003 |
| 2018/0172858 | A1 | 6/2018 | Wang et al. |

OTHER PUBLICATIONS

Ma, Yong et al., "Full waveform inversion with image-guided gradient," Center for Wave Pheonomena, Colorado School of Mines, issue 651, 2010, pp. 141-154.

Jones, Ian F., "Tutorial: Velocity estimation via ray-based tomography," First Break, vol. 28, Feb. 2010, pp. 45-52.

Wang, Chao et al., "Fast multi-parameter anisotropic full waveform inversion with irregular shot sampling," ION Geophysical Corporation, SEG Denver 2014 Annual Meeting, pp. 1147-1151.

Bai, Jianyong et al., "Simultaneous inversion of velocity and density in time-domain full waveform inversion," ION Geophysical Corporation, SEG Denver 2014 Annual Meeting, pp. 922-927.

Dingus, Carolyn, "Seismic Processing—Noise Attenuation Techniques for Relative Amplitude Processing," Petroleum Africa, Dec. 2010, pp. 47-49.

Ion, "Full Waveform Inversion," Jan. 1, 2011, from iongeo.com, 2 pages.

Kim, Youngseo et al. "An Algorithm for 3D acoustic time-Laplace-Fouerier-domain hybrid full waveform inversion." Geophysics, vol. 78, No. 4, Jul. 1, 2013, 16 pages.

Virieux, J. et al. "An overview of full-waveform invesion in exploration geophysics." Geophysics, vol. 74, No. 6, Nov. 1, 2009. 26 pages.

International Search Report and Written Opinion dated May 11, 2018 in connection with International Patent Application No. PCT/US2017/067437, 11 pages.

* cited by examiner

SYSTEM AND METHOD FOR RECONSTRUCTED WAVEFIELD IMAGING

CROSS-REFERENCE TO RELATED APPLICATION(S)

THIS APPLICATION claims priority to U.S. Provisional Patent Application Ser. No. 62/436,724, SYSTEM AND METHOD FOR RECONSTRUCTED WAVEFIELD IMAGING, filed Dec. 20, 2016, which is incorporated by reference herein, in the entirely and for all purposes. This application is related to U.S. patent application Ser. No. 15/375,471, SYSTEM AND METHOD FOR RECONSTRUCTED WAVEFIELD INVERSION, filed Dec. 12, 2016, which is incorporated by reference herein, in the entirety and for all purposes.

BACKGROUND

This application relates generally to seismic data acquisition and processing, and more specifically to systems and methods for seismic imaging seismic data. In particular, the application encompasses full waveform inversion (FWI) techniques adapted to derive high-fidelity images of subsurface structures, including petrochemical reservoirs and other geophysical features.

Petrochemical products are ubiquitous in the modern economy, and can be found in everything from oil and gasoline to medical devices, children's toys, and a wide range of everyday household items. To meet the continuing demand for these products, oil and gas reserves must be accurately located and surveyed, so that these important resources can be effectively managed. As a result, there is an ongoing need for new seismic sensor systems, and for more advanced seismic exploration and imaging technologies.

Scientists and engineers typically utilize seismic wave-based exploration to locate new oil and gas reservoirs, and to survey and manage existing reserves over time. Seismic surveys are performed by deploying an array of seismic sensors or receivers over the region of interest, and monitoring the response to controlled emission of seismic energy via one or more seismic sources such as vibrators, air gun arrays, and explosive detonations. The response depends upon the seismic energy reflected from mineral reservoirs and other subsurface formations, allowing an image of the corresponding geological structures to be generated.

Conventional marine seismic surveys typically proceed by towing an array of seismic sensors or receivers behind a survey vessel, with the receivers distributed along one or more streamer cables. A set of air guns or other seismic sources is used to generate the seismic energy, which propagates down through the water column to penetrate the ocean floor (or other bottom surface). A portion of the seismic energy is reflected from subsurface structures, and returns through the water column to be detected in the streamer array. Alternatively, the seismic receivers can also be disposed along an ocean-bottom cable, or provided in the form of autonomous seismic nodes distributed on the seabed.

Geophysical data pertaining to subsurface structures is acquired by observing the reflected seismic energy with an array of seismic receiver components. Suitable seismic receivers include pressure sensors and particle motion detectors, which can either be provided individually or combined together in close proximity within a receiver module or seismic node. Suitable pressure sensors include hydrophones and hydrophone arrays adapted to record pressure measurements of the seismic wavefield propagating through the surrounding water column, or other seismic medium. Suitable particle motion sensors include accelerometers and geophones configured to provide single-axis or multi-axis (three-dimensional) velocity measurements, in order to characterize motion of the seismic medium in response to propagating seismic waves.

Seismic signals from the sensor arrays can be processed to reconstruct the seismic wavefield, and to generate images charactering features of the subsurface geology, including subsurface composition and structures in and around the survey area. Across these techniques, image quality depends on the fidelity of the wavefield, creating a substantial ongoing demand for more advanced methods of reconstruction-based seismic imaging techniques.

SUMMARY

This disclosure is directed to seismic imaging techniques implemented by adapting the reconstructed wavefield method in the time domain. Reconstructed wavefield imaging (RWI) can be utilized to provide high-resolution seismic images with improved focusing and true migration amplitude. The RWI method is also capable of removing or reducing migration artifacts related to reverse time migration (RTM), and can demonstrate substantial advantages in subsurface regions with sharp velocity contrasts and related geophysical feature of interest.

DETAILED DESCRIPTION

In this disclosure, reference is made to examples and embodiments of the invention. However, it should be understood that the invention is not limited to these or any other specifically described embodiments. Any combination of the disclosed features and elements, whether related to different embodiments or not, is contemplated to implement and practice the invention. Furthermore, in various examples and embodiments the invention provides numerous advantages over the prior art. Although certain embodiments may achieve these and other advantages over different potential solutions, and over the prior art, whether or not a particular advantage is achieved by a given embodiment is not limiting of the invention as claimed. Thus, the following aspects, features, embodiments and advantages are merely illustrative, and should not be considered elements or limitations of the claims, except where explicitly specified in the claim language. Likewise, references to "the invention" shall not be construed as a generalization of any inventive subject matter disclosed herein, and shall not be considered to represent an element or limitation of any claim except where expressly recited therein.

Some embodiments of the invention may be implemented as a program product or executable method for use with a computerized system. Suitable programs may define functions of the various embodiments and methods described herein, and can be provided via a variety of non-transitory computer-readable media. Illustrative computer-readable media include, but are not limited to: (i) information permanently stored on non-writable storage media (e.g., read-only memory within a computer such as ROM devices or CD-ROM disks); (ii) alterable information stored on writable storage media (e.g., random access or RAM devices, flash memory and other solid-state devices, and magnetic disks or hard drives); and (iii) information conveyed to a computer by a communications medium, such as through a wireless network, including applications, program code and other information downloaded from the Internet or other network. Suitable non-transitory computer-readable media embodiments include computer-readable instructions that are executable on a computer processor to direct the various functions and method steps of the present invention, and also represent embodiments of the present invention.

The invention can also be practiced in combination with other seismic waveform or wavefield reconstruction and imaging techniques. These include, but are not limited to, techniques discloses in the following references, each of which is incorporated by reference herein, in the entirety and for all purposes: Claerbout, J., "Toward a unifed theory of reflector mapping," Geophysics, 36, 467-481 (1971); Wang, C., Yingst, D., Farmer, P. and Leveille, J., "Full-waveform inversion with the reconstructed wavefield method, Expanded Abstracts, Society of Exploration Geophysicists, Dallas, Tex., 1237-1241 (2016).

Seismic Survey Techniques

Figure 1:
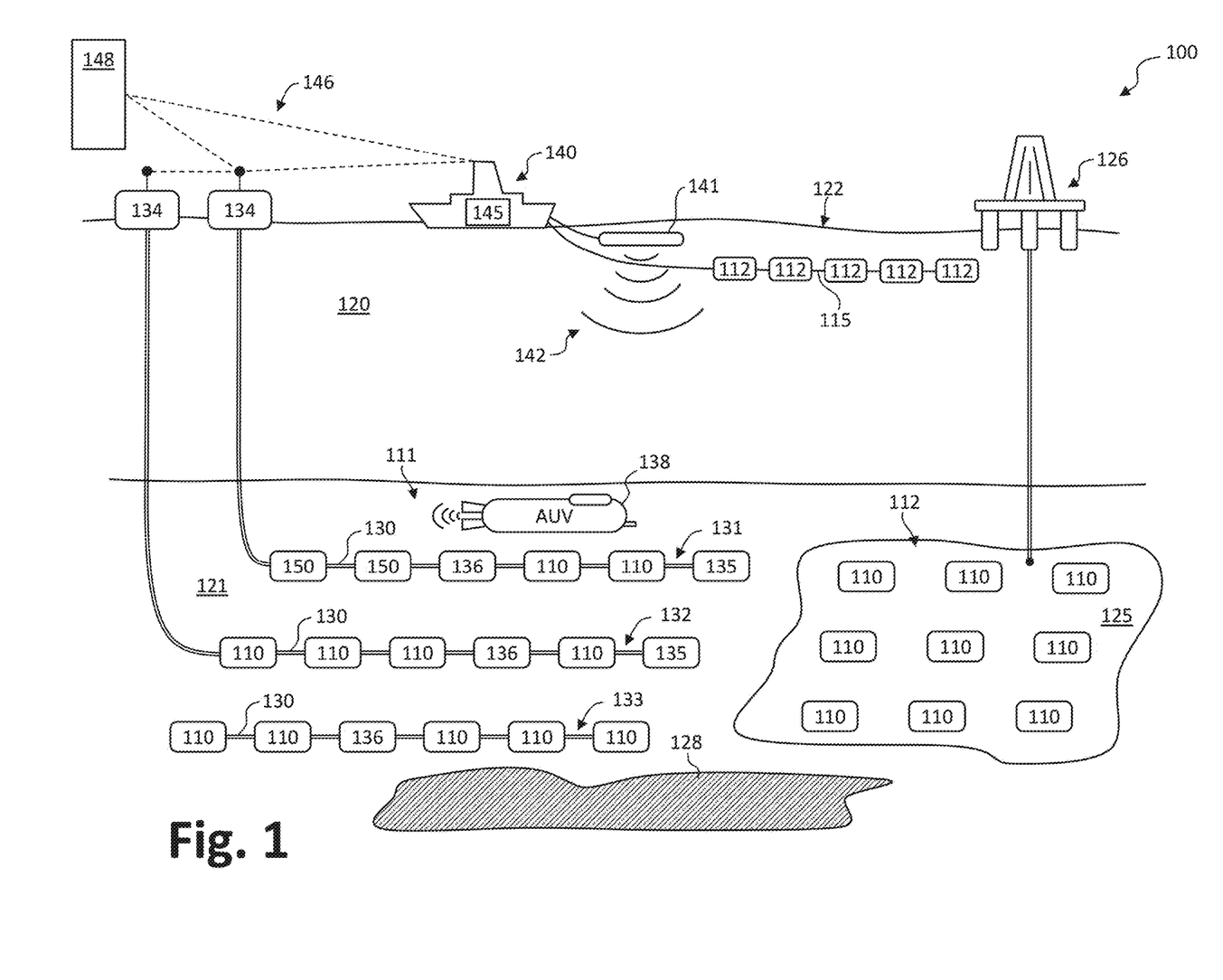
FIG. 1 is a schematic illustration of an exemplary seismic survey configured for acquiring seismic data.

FIG. 1 illustrates an exemplary seismic survey 100 suitable for obtaining field data processed according to various embodiments of the invention. As shown in FIG. 1, a plurality of autonomous sensor stations or nodes 110 may be deployed a body of water or water column 120, e.g., on a seabed or other bottom region 121 disposed below the surface 122 of water body 120. Alternatively or in combination, a number of similar nodes or seismic receivers 112 can be towed behind a seismic survey ship or other surface vessel 140.

As shown in FIG. 1, two or more of the nodes 110 may be deployed in an array 111 on the sea floor or bed 121 via a rope or wire 130. Similarly, a number of seismic receivers 112 can be deployed in the water column 120 along a streamer cable or streamer array 115, and towed below the surface 120 behind a seismic vessel 140.

While references may be made to a sea floor or seabed with respect to this example, practice of the invention is not limited to any particular body of water or water column. Rather, embodiments of the invention may be used in any water, marine, land-based or other environment including oceans, lakes, rivers, etc. Accordingly, the use of the term sea, seabed, sea floor, and the like should be broadly understood to encompass all bodies of water 120 and all marine or land-based surfaces 121 suitable for propagation of seismic energy.

In some embodiments, the rope 130 may be made from a synthetic material with a predefined specific density relative to the water in which it is immersed. In some embodiments, the rope 130 may be a passive rope, i.e., it may not include any electrical conductors. In alternative embodiments, the rope or cable 130 may include embedded conductors for communicating one or more of a clock signal, data signals, control signals and power among the individual seismic nodes 110. Thus, rope or cable 130 may have either a passive configuration, absent signal or power communications, or an active configuration, in which signal and/or power connections are provided.

In particular embodiments, one or more seismic nodes 110 may be deployed to the sea floor or other surface 121 via any suitable technology, e.g., via a remotely or autonomously operated underwater vehicle (ROV or AUV) 138, by dropping nodes 110 from a deployment vessel or seismic vessel 140, etc. In other embodiments, each autonomous node 110 may be equipped with a propulsion system and programmed to navigate through the water column 120 to and from predetermined locations on the sea floor 121.

As can be seen in FIG. 1, deployment of the individual seismic nodes 110 in a seismic array 111 can be thus be performed without a rope 130, and this may be advantageous in areas near obstructions, e.g., in a working area 125 of the sea floor 121 associated with an oil rig 126 or other operations, in order to avoid the rope 130 coming into contact with and potentially damaging or being damaged by obstructions and other underwater components during deployment and/or retrieval of the nodes 110.

In some embodiments, rope-deployed seismic sensor stations may be coupled to a hub or buoy 134. For example, two rope segments 131 and 132 are shown coupled to hubs 134. While the hubs 134 are shown as provided on floating buoys, this is also merely representative. In alternative embodiments, one or more of the hubs 134 may be placed on the sea floor 121. Hubs 134 may also float within the water column 120 at a predefined depth above the sea floor 121 or below the upper surface 122.

In some embodiments, the hubs 134 may include a high precision or "master" clock and communications components configured for data and/or power communications with the nodes 110. For example, a clock signal from the high precision clock may be transferred to the nodes 110 via conductors in the ropes 130, in order to facilitate clock correction or to generate a clock signal at the nodes 110.

In some embodiments, the hubs 134 may also be configured to transfer power, data, and/or control signals to the nodes 110. Accordingly, the hubs 134 may be equipped with power generation and or energy storage devices, and/or control logic for performing quality checks and implementing predefined operating protocols, and the like. In some embodiments, signals sent from the hubs may be used, for example, to recharge sensor station batteries, to perform quality and station health tests, to turn the stations on or off, etc. In some embodiments, the hub devices may be equipped with a global positioning satellite (GPS) apparatus or other positioning or navigational system, with or without a radio transmitter or receiver to facilitate determining location of the hubs 134 and communication with other the hub devices 134 and nodes 110.

In embodiments where one or more of the ropes 130 are configured to transfer power or data signals, a tail termination device 135 may be provided at an end of each rope 130.

A separate head termination device may also be provided in the hub device 134, and the sea water may be used to couple the head and tail termination devices. In some embodiments, the hub devices 134 may be omitted. For example one representative rope segment 133 is shown without an associated hub device, and without a tail termination device.

In some embodiments, a plurality of source boats or seismic vessels 140 may be simultaneously operated while acquiring seismic data with nodes 110 or receivers 112, or both. In embodiments where multiple vessels 140 are used, the source boats may be configured to operate their respective seismic sources 141 according to a simultaneous source regime. For example, the sources 141 of two or more source boats 140 may be configured to emit seismic energy substantially simultaneously, or with a predefined delay such that there is at least some overlap in the duration of emission of seismic energy from two or more sources 141. In additional embodiments, a number of nodes 110 or receivers 112 can be deployed in the water column 120 by one or more such vessels 120, and operated as a towed seismic array.

In some embodiments, a high precision clock may be included in each node 110, or in selected seismic nodes 110. In alternative embodiments, a high precision clock signal may be provided via an external master clock configured to coordinate with slave timing devices that are implemented in the seismic nodes 110. The master clock may be located on a hub device 134, or in devices 136 placed at predefined intervals along an individual rope or cable 130. In one embodiment, the devices 136 may include a high precision clock and an interface or other communications components. In alternative embodiments, the devices 136 may include other components such as power sources. In yet another embodiment, one or more such devices 136 may be configured as a "superstation" or similar seismic node, e.g., in the form of a seismic sensor device with all the components of a seismic node 110, as well as a high precision clock that can be used to provide a master clock signal to other nearby seismic nodes 110.

Seismic Data Acquisition

Referring again to FIG. 1, one or more source boats or vessels 140 can be configured to tow seismic source(s) 141 and one or more arrays 115 of nodes or seismic receivers 112 while conducting a seismic survey. Alternatively or in combination, a number of seismic nodes 110 may be deployed in one or more arrays 111 on the ocean floor 121. In one embodiment, the seismic source(s) 141 may include one or more air guns configured to release blasts of compressed air into the water column 120, emitting acoustic energy towards the seabed 121. As shown in FIG. 1, for example, a blast of compressed air generates seismic waves 142 which travel down through the water column 120 to the seabed 121. Seismic waves 142 can also penetrate the seabed 121 to reflect from a subsurface reservoir or other structures 128.

Portions of the seismic energy reflected from subsurface structures 128 can be recorded as seismic data by the arrays 111 and/or 115 of seismic nodes 110 and seismic receivers 112, where the seismic data characterize the corresponding reflected seismic wavefield in the surrounding water column 120. The seismic data may thereafter be processed to develop an image of the subsurface layers and other structures, utilizing advanced reconstructed wavefield imaging techniques, as described herein. These images can be analyzed by geologists and other users employing image processing techniques, in order to identify subsurface reservoirs 128 and other structures likely to include hydrocarbons or other resources, and to locate additional geophysical features of interest.

For example, the seismic data collected by nodes 110 and receivers 112 can be communicated to a computer apparatus or similar processor system 145 on vessel 140, e.g. along streamer cable(s) 115 and/or via a wired or wireless data connection 146 to the hubs 134, which are connected to the nodes 110 via the ropes 130. Alternatively, the nodes 110 and/or receivers 112 can be recovered via the cables 115 and 130 for data retrieval on board the seismic vessel 140, or an autonomous vessel 138 or similar submersible craft can also be configured to retrieve the nodes 110 for data recovery on board vessel 140, or to recover the data from individual nodes 110 while the nodes 110 remain deployed on the ocean bed 121. Inductive and acoustic data links can also be used to transfer seismic data among any one or more of the autonomous vessel 138, nodes 110, receivers 112 and seismic vessel 140.

Typically, the seismic data are transferred from vessel 140 to a computing system 148 for inversion and image processing, for example using bulk data storage media or a wired or wireless network connection 146. Data processing and imaging system 148 may be remote, land-based, cloud-based, distributed, remotely located, or any combination thereof, for example using a cluster of computer nodes connected by a combination of local and distributed network components. Alternatively, at least a portion of the desired processing may be performed by a computer system 145 on board the seismic vessel 140. Specific preprocessing steps can also be performed by one or more of the seismic nodes 110 or receivers 112, e.g., before transfer of the data to computer system 145 on board the vessel 140 or to the remote data processing and imaging system 148.

Figure 2:
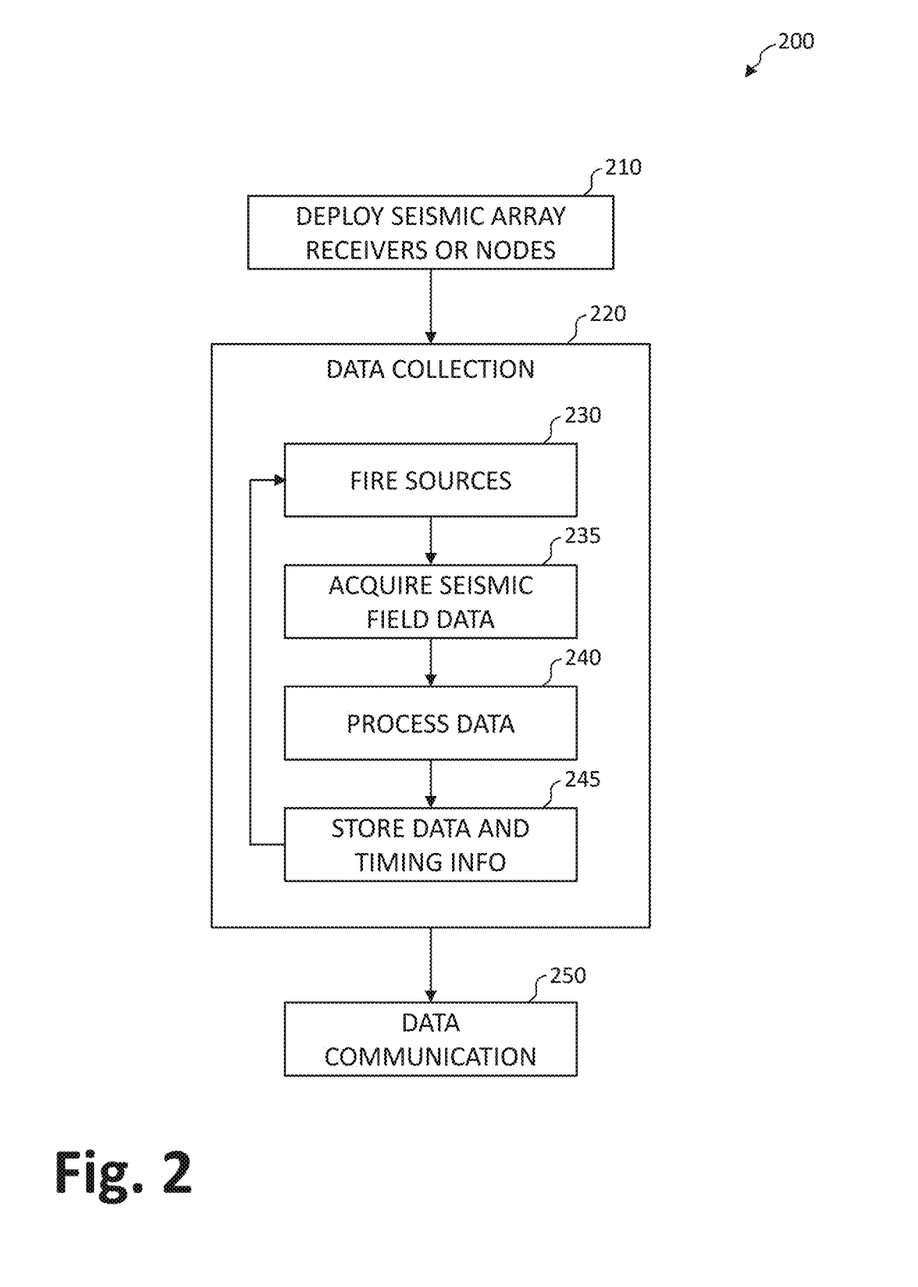
FIG. 2 is a block diagram of a method for acquiring geophysical data from a seismic survey.

FIG. 2 is a block diagram illustrating a method 200 for acquiring seismic data, including, but not limited to, data collected during operation of a seismic survey 100 and suitable for time domain reconstructed wavefield imaging, as described herein. As shown in FIG. 2, method 200 includes one or more steps of deploying a seismic array (step 210), data collection (step 220), and data communication (step 250). These steps may be performed in any combination or order, and may include any number of additional functions, including any one or more of the additional seismic data processing steps described herein.

Deployment (step 210) comprises deploying an array of seismic sensor devices in a survey area. For example, an array 111 of seismic nodes 110 can be deployed along a number of ropes or cables 130 extending along the ocean floor 121 below a water column 120, on in an autonomous node configuration, as described above with respect to FIG. 1. Alternatively or in combination, an array of seismic receivers 112 can be deployed along one or more seismic streamer cables 115, and towed beneath the surface 122 of the water column 120 by a seismic vessel 140.

Data collection (220) can comprise one or more additional steps of operating one or more seismic sources (step 230), e.g., to generate a source signal that is reflected from subsurface geology in the survey area; sampling reflected seismic waves to acquire field data (step 235); performing local node and receiver-based processing or preprocessing (step 240) on the data and associated timing information; and storing the seismic data (step 245), in order to characterize the acquired wavefield. Portions of the node and receiver-based seismic data processing and preprocessing steps can take place individually or in parallel, e.g., using a number of local processors distributed throughout the seismic array.

Data communication (step 250) comprises transferring the seismic data and associated timing information to a seismic data processing cluster or similar computer apparatus, in order to perform RWI-based seismic imaging. Alternatively or in combination, data can also be transferred among the individual seismic receivers or nodes in order to facilitate higher-level distributed data processing.

In operation, the field data are responsive to the source signature and thus to the subsurface geology, which can be imaged based on the response. More specifically, the field data are acquired (step 220) by an array of seismic sensors that are responsive to the source signature by sampling its reflection from the subsurface geology (step 235). To accomplish this, each of the seismic sensors may comprise one or more hydrophones or geophones coupled to a water column or other seismic medium through which the source signature and reflections propagate.

The seismic sensors can be deployed (step 210) in such a water column or other seismic medium as described above with respect to FIG. 1, for example as a towed streamer array or on the ocean floor proximate a hydrocarbon reservoir or other selected survey area. One or more of the sources are fired to generate the source signal (step 230), e.g., using a towed air gun apparatus. Field data are then acquired by the receivers or nodes (step 235), and are responsive to the subsurface geology based on the reflection of the source signal from the corresponding subsurface geophysical structures. The data can be processed (step 240) and stored (245) locally on the receiver or node, and then uploaded for communication (step 250) to a data processor cluster (step 250) in order to generate seismic images of the subsurface geology in a particular survey area.

Reconstructed Wavefield Imaging

By adapting the reconstructed wavefield method in the time domain, reconstructed wavefield imaging (RWI) can provided high-resolution images with improved focusing and true migration amplitude. RWI methods are also capable of reducing migration artifacts related to standard reverse time migration (RTM), with substantial advantages in imaging subsurface regions with sharp velocity contrasts and other geophysical structures of interest. For example, consider the following general form for a wave equation:

$$\Box[m]u=f \quad [1]$$

In this expression, m represents the subsurface model parameters, $\Box[m]$ is the wave operator (or d'Alembert operator), which depends upon the modeling parameters m, u is the forward propagated wavefield, and f is the source term (or source function).

Given an initial model, one RTM-based approach is to solve the wave equation substantially exactly, going forward in time with a given source function (f), and propagating the recorded data backwards in time. A suitable imaging condition for RTM can be expressed as a cross-correlation of the forward-propagated wavefield (u) with the backward propagated wavefield.

Letting S[m] denote a solution operator for the forward propagated wave equation, the forward-propagated simulated (or synthetic) wavefield can be computed as a function the source function (f), for example as follows:

$$u=S[m]f \quad [2A]$$

Similarly, the backward-propagated simulated (or synthetic) wavefield can be computed based on the field data ($d_0$):

$$u^\dagger = S^* P^* d_0. \quad [2B]$$

Here, S* is the adjoint of the solution operator S[m], where "*" denotes the adjoint, and P* is the adjoint of the restriction operator P (or projection) that records the wavefield u at the receiver locations (e.g., P generates the projected wavefield Pu as modeled at the various discrete receiver positions).

The cross-correlation imaging condition can be expressed as $$I(x) = \iint u(x,t;x_s) u^\dagger(x,t;x_s) dt \, dx_S \quad [3]$$

In practice, however, the imaging quality of RTM techniques can still suffer or be degraded even with a relatively good model, since the acoustic (pressure) wavefields are typically propagated, while the earth is a viscoelastic medium. To improve the image quality, an inversion based migration can be employed. Depending on embodiment, the inverted or reconstructed wavefield can then match the data, as well as satisfy the wave equation in an $l_2$ sense, e.g., an approximate solution based on a second-order Lagrange approximation or other suitable technique, taken to the desired order.

The process of inversion for reconstructing the wavefield (u) can be formulated as a minimization problem, e.g. as follows:

$$J_\lambda[u] = \frac{1}{2}\|Pu - d_o\|_2^2 + \frac{\lambda^2}{2}\|\Box[m]u - f\|_2^2. \quad [4]$$

In this expression, $\lambda$ is "penalty scalar." The first ("data misfit") term is based on the difference between the actual field data ($d_0$) and the simulated or synthetic data (Pu), obtained by projecting the forward simulated wavefield (u) onto the physical receiver locations via the restriction operator (P). The penalty term or scalar ($\lambda$) is applied to the second ("wave equation error") term, depends on the difference between the source function (f) and the d'Alembert (wavefield) operator ($\Box$), as applied to the forward simulated wavefield (u).

The simulated wavefield (u) can be defined as forward-going to fall within the range of the forward-propagation operator S; that is, u=S[m] g, for some function g. The function g can be referred to as the reconstructed source, or alternatively as the extended source. Note that the extended source (g) relates to the simulated wavefield via $\Box[m]u=g$, so the second term of the objective function can be cast in terms of the reconstructed source and generalized model parameters (m), e.g., as follows:

$$\overline{J_\lambda}[g] = \frac{1}{2}\|PS[m]g - d_0\|_2^2 + \frac{\lambda^2}{2}\|g - f\|_2^2. \quad [5]$$

Since a mismatch or residual is built into the reconstructed or extended source term (g), the reconstructed wavefield (u) can match the true wavefield data ($d_O$) more closely, so that the migration image quality will be improved with respect to the true amplitude. Depending on embodiment, the procedure may be considered equivalent to solving a least squares problem, e.g., in a form such as:

$$\min_g \left\| \begin{pmatrix} PS[m] \\ \lambda I \end{pmatrix} g - \begin{pmatrix} d_0 \\ \lambda f \end{pmatrix} \right\|_2^2. \quad [6]$$

In some embodiments, the problem can be reduced to a normal equation, e.g., such as:

$$S^*P^*PSg+\lambda^2 g=S^*P^*d_0+\lambda^2 f \quad [7]$$

Generally, the reconstructed source (g) can be considered in terms of a solution of the corresponding normal equation. Writing the reconstructed source term (g) as a perturbation of the original (unperturbed) source term f, for example:

$$g=f+\delta f, \quad [8]$$

Depending on application, the perturbation of the source (δf) can be expressed according to an asymptotic expansion, e.g., as follows:

$$\delta f=S^*P^*d_0/\lambda^2-S^*P^*PSf/\lambda^2+O(1/\lambda^4). \quad [9]$$

To improve computational feasibility (and reduce processing costs), terms of order $(1/\lambda^4)$ may be substantially ignored on the right-hand side of the equation. Using a tilde symbol ("~") to represent any wavefield terms that have been approximately reconstructed, the corresponding reconstructed source term ("g-tilde") can be approximately calculated or determined using an expression such as:

$$\tilde{g}=f+\tilde{\delta f}, \quad [10]$$

in which:

$$\tilde{\delta f}=S^*P^*(d_0-PSf)/\lambda^2. \quad [11]$$

Having a reconstructed source term (g-tilde), the forward wavefield can be reconstructed by reconstructing the source; e.g.:

$$\tilde{u}=S\tilde{g}. \quad [12]$$

A new cross-correlation imaging condition can then be define based on the approximate forward-reconstructed wavefield (u-tilde), for example as follows:

$$\tilde{I}(x)=\iint \tilde{u}(x,t;x_s)u^\dagger(x,t;x_s)dt\,dx_S. \quad [13]$$

In this expression, the (approximately) reconstructed forward-propagated wavefield term (u-tilde) is generated with the reconstructed source term (g-tilde), and $u^\dagger$ (u-dagger) is the backward propagated wavefield, e.g., as generated from the recorded field data (do).

Depending on embodiment, an additional term can be added or otherwise included to compute or determine the cross-correlation of the conventional forward propagated wavefield with a given source signature and the backward propagation of the reconstructed synthetic data. The RWI methodology is also not limited to any particular cross-correlation imaging condition, and can be easily applied to other alternative imaging conditions as well, such as a deconvolution imaging condition or energy imaging condition. To further improve the quality of seismic imaging, the procedure can be iterated for updating the model using full wavefield inversion (FWI), e.g., with a reconstructed wavefield method RFWI, and then migrate with the improved model The RWI approach can be summarized in a number of representative method steps, e.g., as described below with respect to FIG. 3. In the particular area of seismic inversions for geophysical applications (e.g., oil and gas exploration and related resource development), these techniques can be applied to seismic wavefields or reflection data obtained during seismic surveys, in order to obtain a subsurface mapping or other information about the geology of an underground reservoir. More particularly, these inversion techniques can be applied to transform seismic wavefield data in the time domain, as well as in the frequency domain, in order to generate improved quantitative descriptions of reservoirs and other subsurface structures, with reduced computational costs.

Figure 3:
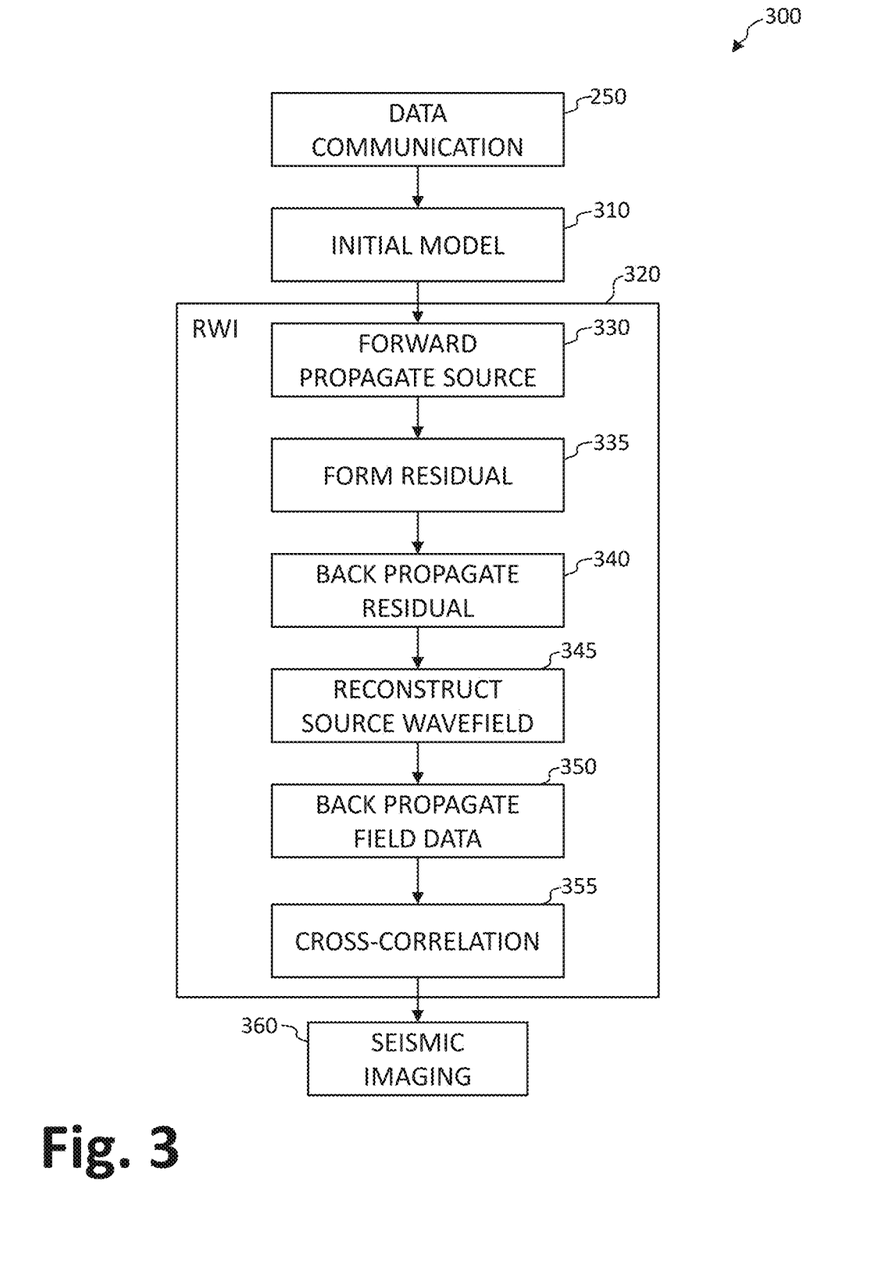
FIG. 3 is a block diagram of a method for processing geophysical data to generate a seismic image.

FIG. 3 is a block diagram illustrating a method 300 for processing seismic data to generate a seismic image, including, but not limited to, reconstructed wavefield imaging (RWI), as described herein. As shown in FIG. 3, method 300 operates on data communicated from a suitable seismic survey (step 250). Method 300 can also utilize an initial model (step 310) generated based on known geology, well bore data, tomography, and other information characterizing subsurface structures and other relevant characteristics of the survey region.

In representative embodiments, suitable methods 300 utilize a reconstructed wavefield imaging (RWI) process (block 320) to perform seismic imaging (step 360). The RWI process can take place in the time domain, generating a seismic survey solution in which specialized algorithms are provided to characterize the acquired wavefield, using models that can be parameterized to include velocity, density, anisotropy, and attenuation of the subsurface geology The steps of method 300 can be performed in any order or combination, and the model iterated in order to converge upon a suitable imaging solution, with the desired degree of precision, accuracy and fidelity. These techniques are applied in innovative workflows, and adapted to process selected sets of seismic data to determine the relevant physical characteristics and other properties of the subsurface structures of interest.

As shown in FIG. 3, the RWI process 320 can include one or more steps of forward propagating a source signal (step 330), forming a residual (step 335), back-propagating the residual (step 340), reconstructing a source wavefield (step 345), back propagating the field data to generate a receiver wavefield (step 350), and cross-correlating the reconstructed source wavefield and the receiver wavefield (step 355) to generate an image (step 360).

Depending on embodiment, forward propagating the original source signal (step 330) can be performed in the time domain, in order to generate a forward-propagated wavefield based on a model of the subsurface region of interest. The model can include one or more seismic parameters characterizing the subsurface region, for example velocity, density, anisotropy or attenuation, or a combination thereof.

Forming or generating a residual (step 335) can be based on the forward-propagated wavefield in comparison to field data. The field data are typically responsive to reflection of the original source signal from the subsurface region, for example where the field data are acquired by an array of seismic sensors including one or more hydrophones or geophones deployed in a water column or other seismic medium, through which the source signal and reflections propagate.

Back propagating the residual (step 340) can also be performed in the time domain, in order to generate a reconstructed source perturbation. A reconstructed source can also be generated, based on the reconstructed source perturbation and the original source signal. The forward and back propagation steps are based on the model, which can be updated or otherwise refined to improve image quality and fidelity of the reconstructed waveforms. In some embodiments, refining the model is performed iteratively, for example based on the reconstructed source wavefield in comparison to the field data.

The reconstructed source can be forward propagated to generate a reconstructed source wavefield (step 345).

Depending on embodiment, generating the reconstructed source wavefield can be performed a minimization process, for example by minimizing an objective function based on the reconstructed wavefield.

The field data can be back propagated (step 350) to generate a receiver wavefield. The forward-propagated reconstructed source wavefield and the back-propagated receiver wavefield can then be cross-correlated to generate a seismic image of the subsurface region, based on the cross correlation.

In additional embodiments, the forward-propagated wavefield can be restricted by projection onto the receiver locations at which the field data are obtained. In these embodiments, additional data can be generated based on the restricted source wavefield, and back-propagated to improve the image generation by cross-correlation, e.g., with the receiver wavefield.

Figure 4:
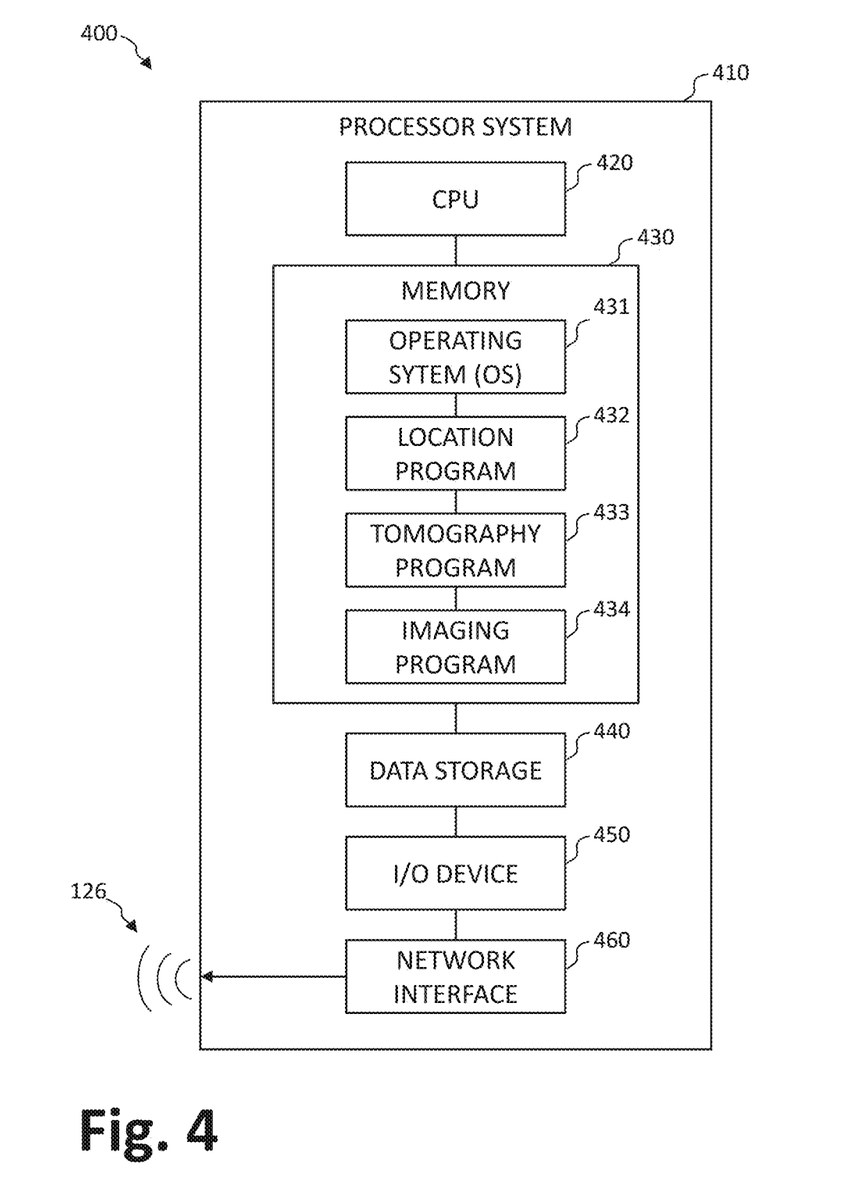
FIG. 4 is a block diagram of a computer processing apparatus configured for seismic imaging.

FIG. 4 illustrates an exemplary computer system 400 configured to practice reconstructed seismic wavefield imaging, for example according to RWI method 300 of FIG. 3. As shown in FIG. 4, seismic image processing system 400 includes one or more individual processor systems 410, each having at least one central processing unit (CPU) 420, one or more memory components 430, a data storage system 440, an input/output device or user interface 450, and network interface device 460. Alternatively or in combination, a number of such processor systems 410 can be combined into a cluster-based system or apparatus 400, e.g., using local or wide-area wired or wireless network connections to individual network interfaces 460 on each processor system 410.

Memory 430 can incorporate one or more random access memory (RAM) modules and similar memory components with sufficient storage capacity to practice the advanced seismic data imaging techniques described here. The components of memory 430 can also operate according to different functional levels, e.g., using a combination of high speed registers, caches, and RAM or DRAM chips.

In the particular example of FIG. 4, memory 430 includes an operating system or OS module 413 and one or more of a location module 432, a tomography module 433, and an imaging module 433. Each of these program components can be embodied as computer code stored on a non-volatile computer-readable medium, where the program code can be executed by CPU 430 in order to execute the seismic imaging techniques disclosed herein.

Data storage system 440 typically encompasses one or more direct access storage device (DASD) elements, e.g., disc drives, tape drives, portable memory cards, flash memory devices, and other electronic, magnetic, and optical storage media. One or both of the memory system 430 and the data storage system 440 can also be implemented as part of a virtual address space, or networked (cloud-based) storage system, spanning multiple primary and secondary storage devices on different processor systems 410.

Suitable input/output (I/O) devices 450 include computer mouse and keyboard devices, trackballs, stylus pens, touchscreens and other display components (e.g., computer monitors), and the like. Input/output devices 450 can be adapted to receive operating instructions and other user input for selective processing of acquired waveforms and other field data obtained in one or more seismic surveys, and to provide output in the form of image data that can be displayed to describe the corresponding subsurface structures.

Network interface 460 can incorporate a range of suitable devices such as network adapters and network interfaces, as configured to provide local and remote network communications among individual data processing systems 410 within the larger computer system 400. Individual network interface devices 460 can also be adapted to provide communications between separate computer systems 400, including clustered and distributed seismic data processing and imaging systems, as described herein, and additional network connections to remote and local servers, internet systems, cloud-based computing and storage components, and the like. Seismic data processing system 400 may thus be centralized, distributed, or remotely located, and can incorporate any combination of ship-board, remote, and node or receiver-based processing components, as described herein.

Modeling

The RWI-based techniques described here can be applied to a number of different imaging problems, including real-world field data and utilizing representative data sets such as SMAART (Subsalt Multiple Attenuation and Reduction Technology Joint Venture) synthetic salt models (e.g., Pluto, Sigsbee or Ziggy). Depending on example, field data can be generated using a representative true model such as the ones displayed in FIGS. 5A and 5B.

Figure 5A:
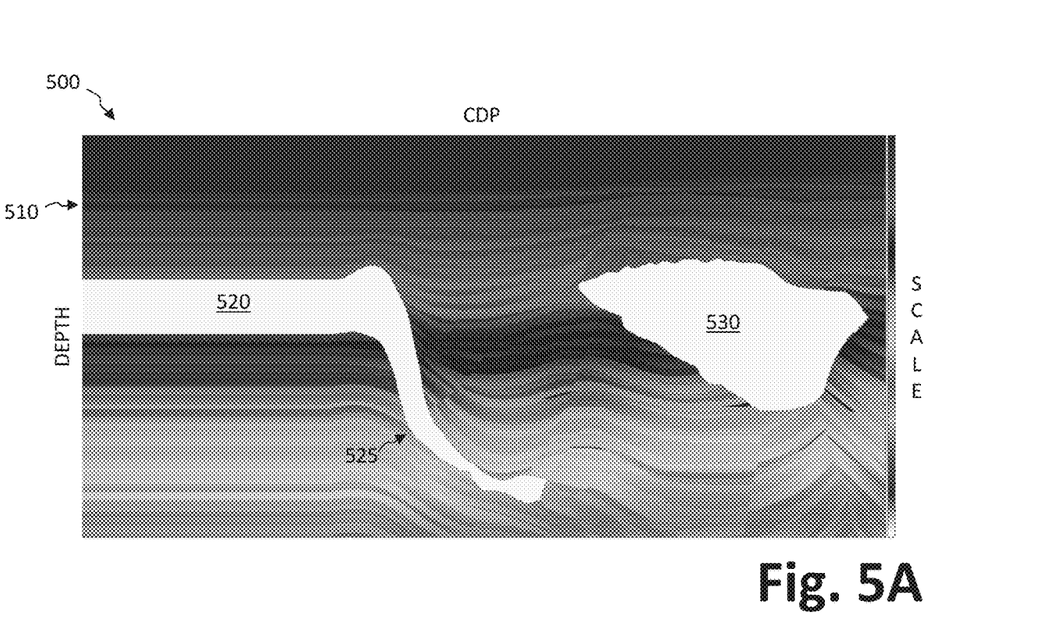
FIG. 5A is a graphical representation of a true velocity model for a selected subsurface geology.

FIG. 5A is a graphical representation of a true velocity model 500 for a selected subsurface geology. As shown in FIG. 5A, the model can include a number of relatively shallow subsurface structures 510 disposed above a salt body or other subsurface structure 520, e.g., with an extension 525 protruding from structure 520, extending deeper into the subsurface region of model 500. One or more similar geological structures 530 can also be modeled, either continuous with structure 520, or disposed discontinuously from structure 520 as shown.

Field data can be generated using the true model displayed in FIG. 5A. For example, shot gathers can be generated with a selected shot spacing (e.g., 50 m, or another suitable spacing), and a maximum frequency can be used for imaging (e.g., 40 Hz, or another suitable maximum).

Figure 5B:
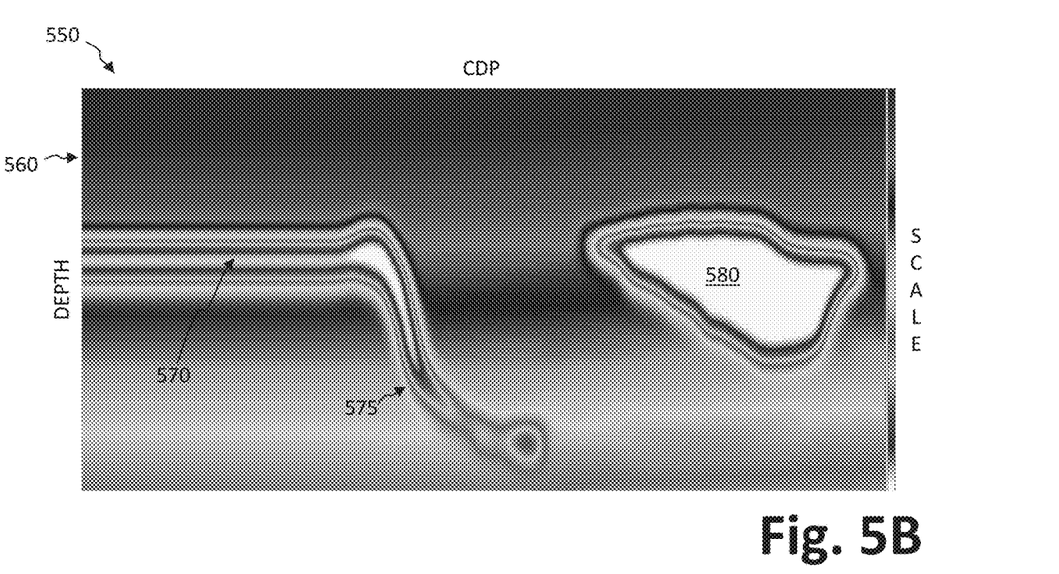
FIG. 5B represents a smoothed version of the velocity model, used for seismic imaging.

FIG. 5B represents a smoothed version 550 of the velocity model, e.g., as used for seismic imaging. As shown in the smoothed model 550 of FIG. 5B, relatively shallow structures 560 may correspond generally to structures 510 of model 500 in FIG. 5A, and the smoothed salt bodies or other deeper structures 570, 575 and 580 may correspond generally to the relatively deeper structures 520, 525 and 530, respectively.

These particular examples, however, are merely representative, and the subsurface structures of interest can vary widely from application to application, depending on the actual geology of the corresponding survey area. Models 500 and 550 can also be applied to other seismic parameters, including, but not limited to velocity, density, anisotropy, attenuation, and combinations thereof.

Figure 6A:
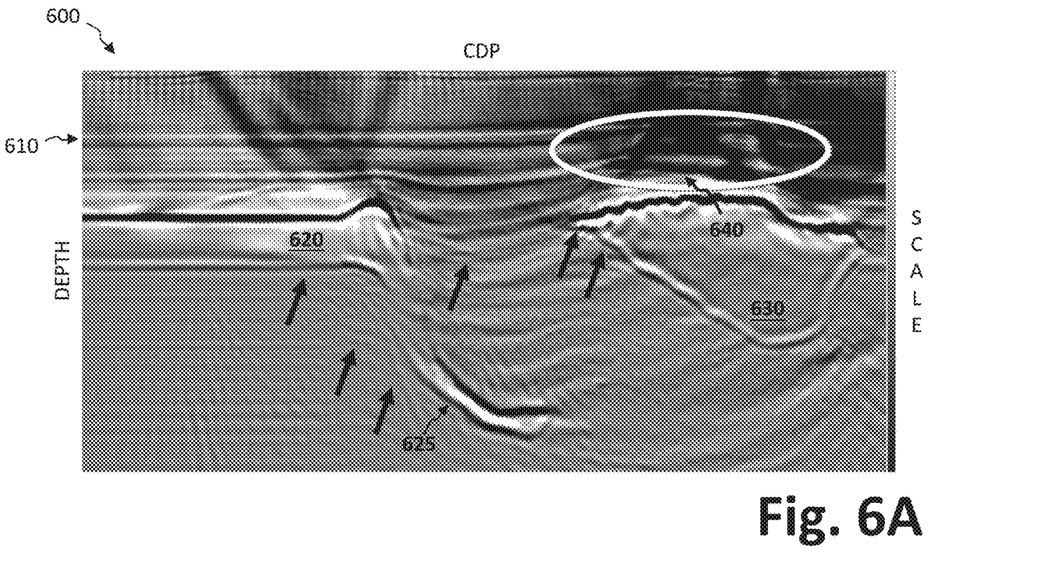
FIG. 6A is a reverse time migration (RTM) image of the subsurface geology, using the velocity model of FIG. 5B.

FIG. 6A is a reverse time migration (RTM) image 600 of the subsurface geology, e.g. as generated using the velocity model of FIG. 5B. As shown by the arrows, deeper subsurface structures 620 and 630 are resolved below shallower structures 610, along with extension 625 of formation 620. These features correspond generally to structures 560, 570, 575 and 580 of FIG. 5B, as described above, but the RTM-based image resolution may be limited as shown. In addition, noise or artifacts 640 can also appear, e.g., in the circled region as shown, which may or may not have a direct physical analog in the model 550 used to generate the image 600.

Figure 6B:
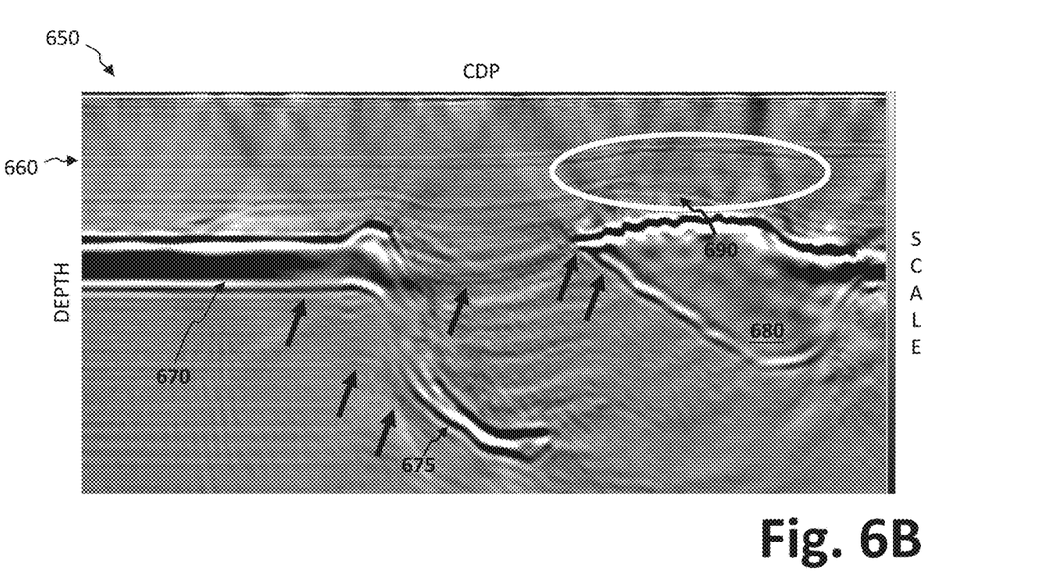
FIG. 6B is an enhanced seismic image of the subsurface geology, using reconstructed wavefield imaging (RWI).

FIG. 6B is an enhanced seismic image 650 of the subsurface geology, using reconstructed wavefield imaging (RWI). As shown in FIG. 6B, RWI-based resolution of subsurface features 660, and 670 and 680 may be substantially improved over a range of depths, as compared to FIG. 6A, including better resolution of extension 675 on structure 680, with reduced artifact or noise generation in the circled region 690. Comparing the RTM image 600 of FIG. 6A and the RWI image 650 of FIG. 6B, the RWI process can substantially improve event continuity for salt bodies and other imaged geophysical features 670, 675 and 680, and correct the amplitude for shallower structures 660. Fidelity with respect to the earth model can also be improved, e.g., by comparing to the corresponding geophysical structures in models 500 and 550 of FIGS. 5A and 5B.

Figure 7:
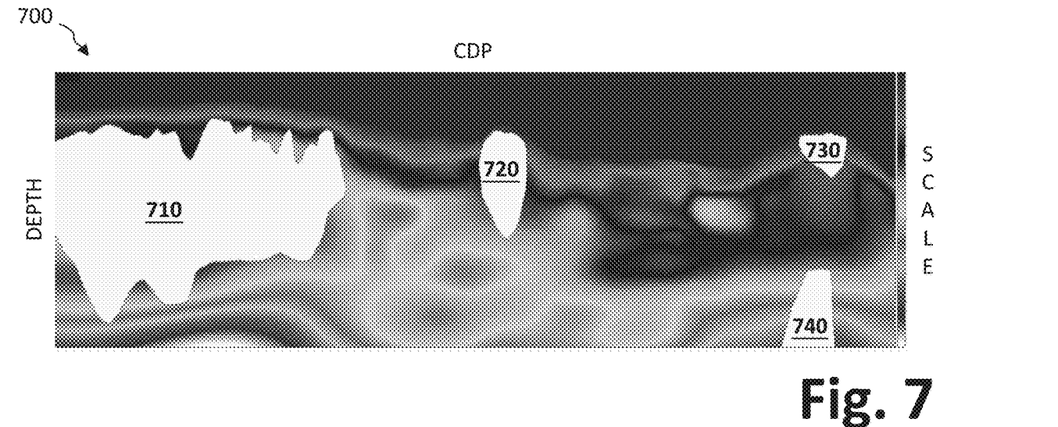
FIG. 7 is a graphical representation of a velocity model for an alternate subsurface geology.

FIG. 7 is a graphical representation of a velocity model 700 for an alternate subsurface geology, for example an offshore streamer data set. As shown in FIG. 7, the alternate geology may include a number of discrete subsurface salt or rock formations and other geophysical structures 710, 720, 730 and 740. In various examples, the acquisition length may be on the order of 100-200 km, or more or less, and basic noise removal can be applied to the input data, for example with the data set being resampled at a selected time scale (e.g., 16 ms, or another suitable value). A suitable shot spacing can also be selected for imaging (e.g., 50 m, or another suitable value), with a maximum frequency used for imaging (e.g., 30 Hz, or another suitable value).

Figure 8A:
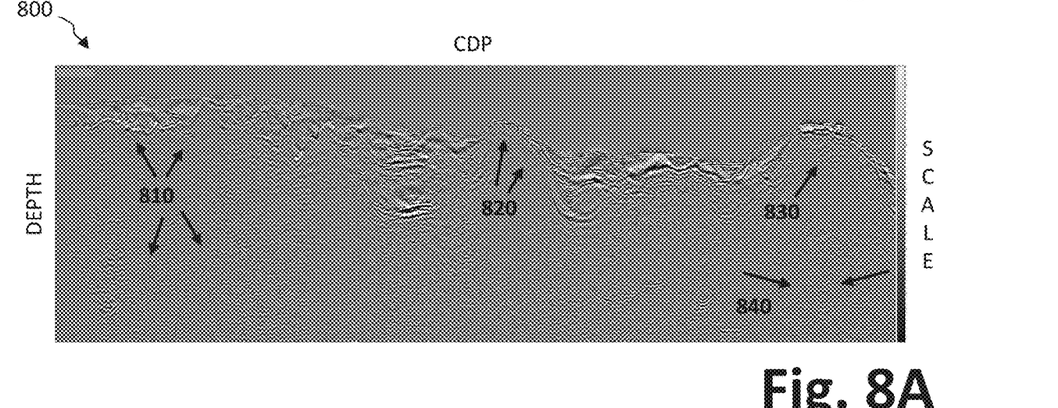
FIG. 8A is a reverse time migration (RTM) seismic image generated using the alternate velocity model of FIG. 7.

FIG. 8A is a reverse time migration (RTM) seismic image 800, e.g., as generated using the alternate velocity model 700 of FIG. 7. As shown in FIG. 8A, RTM image 800 includes features 810, 820, 830 and 840, corresponding to subsurface structures 710, 720, 730 and 740 of model 700 in FIG. 7. Again, RTM resolution may be somewhat limited, as known in the art, particularly for the lower boundaries for features 810, 820 and 830, as indicated by the arrows in FIG. 8A, while even deeper features 840 may not be well resolved at all.

Figure 8B:
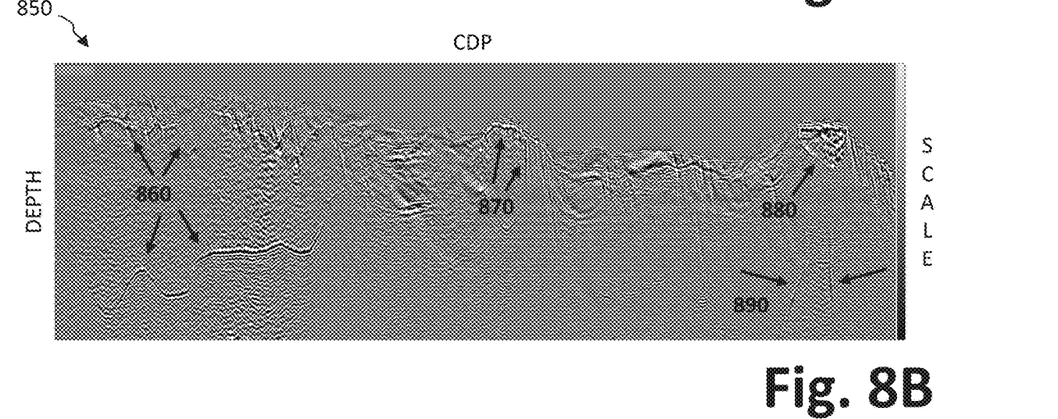
FIG. 8B is an enhanced seismic image of the alternate subsurface geology, using reconstructed wavefield imaging (RWI).

FIG. 8B is an enhanced seismic image of the alternate subsurface geology, using reconstructed wavefield imaging (RWI). As shown by comparison to FIG. 8A, RWI-based resolution is substantially improved for features 860, 870, 880 and 890, with greater fidelity to the corresponding subsurface structures 710, 720, 730 and 740 in model 700 of FIG. 7. From the comparison, it is clear to see that imaging not only the top salt or other features 710, 720, 730 has been improved, but also deeper events 740 are much better focused, e.g., at the base salt. The amplitude for subsalt and other subsurface imaging is also more balanced, and the events are more continuous. While the increased resolution may thus be more evident for the lower boundaries and other deeper structural features, as shown by the arrows, there is also improved resolution and fidelity in both the lower depth and higher depth regions, including, but not limited to, the substantially vertical boundaries of both shallower geological features 860, 870 and 880, and the entirety of the deeper geological feature (or features) 890.

More generally, the novel RWI techniques described here improve imaging by adapting a reconstructed wavefield method in the time domain. This reconstructed wavefield imaging (RWI) approach provides high-resolution seismic images of the relevant subsurface geology, with improved focusing and true migration amplitude. These techniques are also capable of removing migration artifacts related to standard RTM processes, and RWI can demonstrate substantial advantages in areas with strong velocity contrasts, as described above.

EXAMPLES

In various examples and embodiments, suitable methods of processing seismic data can include one or more steps of forward propagating an original source signal based on a model of a subsurface region to generate a forward-propagated wavefield in a time domain, and generating a residual based on the forward-propagated wavefield in comparison to field data, where the field data are responsive to reflection of the original source signal from the subsurface region. Depending on embodiment, the method may also include one or more of: back propagating the residual to generate a reconstructed source perturbation in the time domain, based on the model; generating a reconstructed source term, based on the reconstructed source perturbation and the original source signal; forward propagating the reconstructed source term to generate a reconstructed source wavefield; and back propagating the field data to generate a receiver wavefield.

Seismic images of the subsurface region can be generated by cross correlating the forward propagated reconstructed source wavefield and the back-propagated receiver wavefield, and generating the images based on the cross correlation. For example, the method can be performed where the model comprises one or more seismic parameters characterizing the subsurface region, and where the images provide information about how these parameters vary in the subsurface region of interest. Suitable seismic parameters include, but are not limited to, one or more parameters selected from velocity, density, anisotropy and attenuation.

Generating the reconstructed source wavefield can be performed by minimization of an objective function, for example based on a cost function of similar function of the reconstructed wavefield. Depending on embodiment, the function can also depend on the model parameters, and suitable methods can further comprise refining the model to improve quality of the image. Refining the model can be performed iteratively, based on the reconstructed source wavefield in comparison to the field data.

In any of the above examples and embodiments, the field data can be acquired by an array of seismic sensors that are responsive to the source signal via reflection from the subsurface region, for example with each of the seismic sensors comprising one or more hydrophones or geophones coupled to a seismic medium through which the source signal propagates. The method may further comprise one or more of: restricting the forward-propagated reconstructed source wavefield to a plurality of corresponding receiver locations at which the field data are obtained, generating reconstructed synthetic data based on the restricted source wavefield; back-propagating the reconstructed synthetic data to generate a reconstructed receiver wavefield; and generating the image based on cross-correlating the forward-propagated wavefield and the back-propagated reconstructed receiver wavefield.

Suitable system seismic data processing apparatus embodiments can include a memory system with one or more memory components configured for storing a model of a subsurface region, along with field data obtained in a seismic survey of the subsurface region. A processor system can be provided in communication with the memory system, as well as a seismic imaging system configured to generate a seismic image of the subsurface region.

The processor system can be configured for one or more steps of: forward propagating an original source signal based on the model to generate a forward-propagated wavefield in a time domain; generating a residual based on the forward-propagated wavefield in comparison to the field data, e.g., where the field data are responsive to reflection of the original source signal from the subsurface region; and back propagating the residual to generate a reconstructed source perturbation in the time domain, based on the model. Additional steps can include one or more of: generating a reconstructed source based on the reconstructed source perturbation and the original source signal; forward propagating the reconstructed source to generate a reconstructed source wavefield; and back propagating the field data to generate a receiver wavefield.

Depending on application, the processor system can be configured for cross correlating the forward propagated reconstructed source wavefield and the back-propagated receiver wavefield. The seismic imaging system can be configured in communication with the processor system, for example to generate the seismic image of the subsurface region, based on the cross correlation.

In any of the above examples and embodiments, generating the reconstructed source wavefield can be performed by minimization of a suitable cost function or other objective function of the reconstructed wavefield. The function may also be based on the model, which can include at least one seismic parameter characterizing the subsurface region, for example where the at least one seismic parameter is selected from one or more of velocity, density, anisotropy and attenuation. The processor system can be configured for iteratively refining the model to improve the seismic image, for example based on the reconstructed source wavefield in comparison to the field data.

The field data may be acquired by an array of seismic sensors responsive to the source signal via reflection from the subsurface region, as described above, for example with each of the seismic sensors comprising one or more hydrophones or geophones coupled to the water column or other seismic medium through which the source signal propagates. The forward-propagated reconstructed source wavefield can be restricted to a plurality of corresponding receiver locations at which the field data are obtained.

In some embodiments, the processor system is further configured for one or more of: generating reconstructed synthetic data based on the restricted source wavefield; and back-propagating the reconstructed synthetic data to generate a reconstructed receiver wavefield. The seismic imaging system can be further configured for generating the image based on a cross-correlation of the forward-propagated wavefield and the back-propagated reconstructed receiver wavefield, as generated by the processing system.

Non-transitory, computer readable data storage medium embodiments are also encompassed, for example with stored program code executable by a computer processor to perform according to any of the method and system embodiments above. In some embodiments, the code can be executed to perform one or more method steps selected from: forward propagating an original source signal based on a model of a subsurface region to generate a forward-propagated wavefield in a time domain; and generating a residual based on the forward-propagated wavefield in comparison to field data, e.g., where the field data are responsive to reflection of the original source signal from the subsurface region.

Suitable method steps can also include one or more of: back propagating the residual to generate a reconstructed source perturbation in the time domain, based on the model; generating a reconstructed source based on the reconstructed source perturbation and the original source signal; forward propagating the reconstructed source to generate a reconstructed source wavefield; and back propagating the field data to generate a receiver wavefield. Such methods can also include cross correlating the forward propagated reconstructed source wavefield and the back-propagated receiver wavefield, where an image of the subsurface region is generated based on the cross correlation.

Suitable computer readable data storage media and other memory components can also be used to store the field data and the model itself, for example using at least one seismic parameter to characterize the subsurface region from which the field data (or seismic survey data) are collected. Suitable seismic parameters may be selected from velocity, density, anisotropy and attenuation, and combinations thereof, and the model can be iteratively refined to improve the seismic image, e.g., based on comparing the reconstructed source wavefield to the field data.

The field data can be acquired by an array of seismic sensors, nodes, or receivers responsive to the source signal, e.g., via reflection from the subsurface region. Each of the seismic sensors can be configured with one or more hydrophones, pressure sensors, geophones or accelerometers, which are coupled to the water column or other seismic medium. The wavefield can be restricted to a plurality of corresponding receiver locations, at which the field data are obtained. In any of these embodiments, the seismic data processing methods described herein can be performed in combination with one or more of: generating reconstructed synthetic data based on the restricted source wavefield and back-propagating the reconstructed synthetic data to generate a reconstructed receiver wavefield, e.g., where the image is generated based on cross-correlating the forward-propagated wavefield and the back-propagated reconstructed receiver wavefield.

In any of these examples and embodiments, the original source signal can comprise or represent a reconstructed source or extended source. For example, the simulated wavefield can be defined as forward-going to fall within the range of the forward-propagation operator for a function referred to as the reconstructed source, or alternatively as the extended source, as described herein. The extended source can be related to the simulated wavefield, and the objective function can be cast in terms of the reconstructed source and generalized model parameters.

While the foregoing is directed to representative embodiments of the present invention, other examples and further embodiments can be devised without departing from the basic scope thereof, as is determined by the claims. The invention is thus described with respect to particular exemplary embodiments, but it is understood that changes can be made and equivalents may be substituted to adapt the disclosure to different problems and application, while remaining within the spirit and scope of the invention as claimed. The invention is thus not limited to the specific examples that are described, but encompasses all embodiments falling within the scope of the appended claims.

The invention claimed is:

1. A method for seismic imaging comprising:
   forward propagating an original source signal based on a model of a subsurface region to generate a forward-propagated wavefield in a time domain;
   generating a residual based on the forward-propagated wavefield in comparison to field data acquired by one or more seismic sensors, wherein the field data are responsive to reflection of the original source signal propagating from the subsurface region through a seismic medium;
   back propagating the residual to generate a reconstructed source perturbation in the time domain, based on the model;

generating a reconstructed source based on the reconstructed source perturbation and the original source signal;
forward propagating the reconstructed source to generate a reconstructed source wavefield;
back propagating the field data to generate a receiver wavefield;
cross correlating the reconstructed source wavefield and the receiver wavefield; and
generating an image of the subsurface region comprising a hydrocarbon or other geophysical feature, based on the cross correlation.

2. The method of claim 1, wherein the model comprises one or more seismic parameters characterizing the subsurface region, the one or more seismic parameters selected from one or more of velocity, density, anisotropy and attenuation.

3. The method of claim 2, wherein generating the reconstructed source wavefield is performed by minimization of an objective function of the reconstructed source wavefield.

4. The method of claim 3, further comprising refining the model to improve quality of the image.

5. The method of claim 4, wherein refining the model is performed iteratively based on the reconstructed source wavefield in comparison to the field data.

6. The method of claim 1, wherein the field data are acquired by an array of seismic sensors, including the one or more seismic sensors, responsive to the original source signal via reflection from the subsurface region, each of the seismic sensors in the array comprising one or more hydrophones or geophones coupled to the seismic medium through which the original source signal propagates.

7. The method of claim 1, further comprising restricting the reconstructed source wavefield to a plurality of receiver locations at which the field data are obtained.

8. The method of claim 7, further comprising:
generating reconstructed synthetic data based on the restricted source wavefield;
back-propagating the reconstructed synthetic data to generate a reconstructed receiver wavefield; and
generating the image based on cross-correlating the forward-propagated wavefield and the reconstructed receiver wavefield.

9. The method of claim 1, wherein the original source signal comprises or characterizes an extended source.

10. A system for seismic imaging comprising:
a memory system with memory components configured for storing:
a model of a subsurface region, and
field data acquired by one or more seismic sensors during a seismic survey of the subsurface region;
a processor system in communication with the memory system, the processor system configured for:
forward propagating an original source signal based on the model to generate a forward-propagated wavefield in a time domain,
generating a residual based on the forward-propagated wavefield in comparison to the field data, wherein the field data are responsive to reflection of the original source signal propagating from the subsurface region through a seismic medium,
back propagating the residual to generate a reconstructed source perturbation in the time domain, based on the model,
generating a reconstructed source based on the reconstructed source perturbation and the original source signal,
forward propagating the reconstructed source to generate a reconstructed source wavefield,
back propagating the field data to generate a receiver wavefield, and
cross correlating the forward-propagated reconstructed source wavefield and the receiver wavefield; and
a seismic imaging system in communication with the processor system and configured to generate a seismic image of the subsurface region comprising a hydrocarbon or other geophysical feature, based on the cross correlation.

11. The system of claim 10, wherein generating the reconstructed source wavefield is performed by minimization of an objective function of the reconstructed source wavefield.

12. The system of claim 10, wherein:
the model comprises at least one seismic parameter characterizing the subsurface region, the at least one seismic parameter selected from one or more of velocity, density, anisotropy and attenuation; and
the processor system is configured for iteratively refining the model to improve the seismic image, based on the reconstructed source wavefield in comparison to the field data.

13. The system of claim 10, wherein the field data are acquired by an array of seismic sensors, including the one or more seismic sensors, responsive to the original source signal via reflection from the subsurface region, each of the seismic sensors in the array comprising one or more hydrophones or geophones coupled to the seismic medium through which the original source signal propagates.

14. The system of claim 10, wherein the reconstructed source wavefield is restricted to a plurality of receiver locations at which the field data are obtained.

15. The system of claim 14, wherein the processor system is further configured for:
generating reconstructed synthetic data based on the restricted source wavefield; and
back-propagating the reconstructed synthetic data to generate a reconstructed receiver wavefield.

16. The system of claim 15, wherein the system is further configured for generating the seismic image based on cross-correlating the forward-propagated wavefield and the reconstructed receiver wavefield.

17. The system of claim 10, wherein the original source signal comprises or characterizes an extended source.

18. A non-transitory, computer readable data storage medium with program code stored thereon, the program code executable by a computer processor to perform a method for seismic imaging comprising:
forward propagating an original source signal based on a model of a subsurface region to
generating a forward-propagated wavefield in a time domain;
generating a residual based on the forward-propagated wavefield in comparison to field data acquired by one or more seismic sensors, wherein the field data are responsive to reflection of the original source signal propagating from the subsurface region through a seismic medium;
back propagating the residual to generate a reconstructed source perturbation in the time domain, based on the model;
generating a reconstructed source based on the reconstructed source perturbation and the original source signal;

forward propagating the reconstructed source to generate a reconstructed source wavefield;

back propagating the field data to generate a receiver wavefield; and cross correlating the reconstructed source wavefield and the receiver wavefield;

wherein an image of the subsurface region is generated that comprises a hydrocarbon or other geophysical feature, based on the cross correlation.

19. The non-transitory, computer readable data storage medium of claim 18, wherein the model comprises at least one seismic parameter selected from velocity, density, anisotropy and attenuation, and the method further comprising iteratively refining the model to improve the image, based on the reconstructed source wavefield in comparison to the field data.

20. The non-transitory, computer readable data storage medium of claim 18, wherein the field data are acquired by an array of seismic sensors, including the one or more seismic sensors, responsive to the original source signal via reflection from the subsurface region, each of the seismic sensors in the array comprising one or more hydrophones or geophones coupled to the seismic medium through which the original source signal propagates.

21. The non-transitory, computer readable data storage medium of claim 18, wherein the reconstructed source wavefield is restricted to a plurality of receiver locations at which the field data are obtained.

22. The non-transitory, computer readable data storage medium of claim 21, the method further comprising:

generating reconstructed synthetic data based on the restricted source wavefield; and back-propagating the reconstructed synthetic data to generate a reconstructed receiver wavefield;

wherein the image is generated based on cross-correlating the forward-propagated wavefield and the reconstructed receiver wavefield.

23. The non-transitory, computer readable data storage medium of claim 18, wherein the original source signal comprises or characterizes an extended source.

* * * * *